US012624533B2

(12) United States Patent
Ye et al.

(10) Patent No.: US 12,624,533 B2
(45) Date of Patent: May 12, 2026

(54) FAUCET ASSEMBLY WITH PLASTIC WATERWAY

(71) Applicant: AS America, Inc., Piscataway, NJ (US)

(72) Inventors: Xiaojing Ye, Edison, NJ (US); Marin Marinov, East Brunswick, NJ (US); Weijian Zhang, Guangzhou (CN)

(73) Assignee: AS America, Inc., Piscataway, NJ (US)

( * ) Notice: Subject to any disclaimer, the term of this patent is extended or adjusted under 35 U.S.C. 154(b) by 39 days.

(21) Appl. No.: 18/698,612

(22) PCT Filed: Oct. 7, 2022

(86) PCT No.: PCT/US2022/077780
§ 371 (c)(1),
(2) Date: Apr. 4, 2024

(87) PCT Pub. No.: WO2023/060249
PCT Pub. Date: Apr. 13, 2023

(65) Prior Publication Data
US 2024/0417960 A1 Dec. 19, 2024

(30) Foreign Application Priority Data
Oct. 8, 2021 (WO) ................ PCT/CN2021/122637

(51) Int. Cl.
E03C 1/04 (2006.01)
F16K 11/078 (2006.01)

(52) U.S. Cl.
CPC .......... E03C 1/0404 (2013.01); E03C 1/0403 (2013.01); F16K 11/0787 (2013.01)

(58) Field of Classification Search
CPC .. E03C 1/0404; E03C 1/0403; F16K 11/0787; F16K 27/045
USPC ............................................. 4/675, 678, 567
See application file for complete search history.

(56) References Cited

U.S. PATENT DOCUMENTS

| | | | |
|---|---|---|---|
| 3,533,436 A | 10/1970 | Parkison | |
| 8,562,831 B2 | 10/2013 | Bors et al. | |
| 8,671,984 B2 | 3/2014 | Rosko et al. | |
| 9,951,880 B2 | 4/2018 | Thomas et al. | |
| 10,921,832 B2 * | 2/2021 | Block | G05D 23/1346 |
| 2022/0195708 A1 * | 6/2022 | Seggio | G05D 23/1313 |

(Continued)

FOREIGN PATENT DOCUMENTS

| | | | | |
|---|---|---|---|---|
| CA | 3081699 A1 * | 12/2020 | ............. | F16K 31/60 |
| WO | WO-2023004325 A1 * | 1/2023 | ........... | G05D 23/134 |
| WO | WO-2024220586 A1 * | 10/2024 | ............. | E03C 1/055 |

*Primary Examiner* — Lori L Baker

(74) *Attorney, Agent, or Firm* — Morrison & Foerster LLP

(57) ABSTRACT

Provided are faucet assemblies having plastic waterways. A faucet assembly can include a plastic manifold comprising a hot water inlet, a cold water inlet, a hot water outlet, a cold water outlet, a mixed water inlet, and a mixed water outlet; a mixing valve comprising a hot water inlet, a cold water inlet, a mixing chamber, and a mixed water outlet, wherein the hot water inlet is fluidly connected to the hot water outlet of the plastic manifold and the cold water inlet is fluidly connected to the cold water outlet of the plastic manifold, and the mixed water outlet is fluidly connected to the mixed water inlet of the plastic manifold; and a plastic outlet pipe comprising a water inlet, wherein the water inlet is fluidly connected to the mixed water outlet of the plastic manifold.

17 Claims, 9 Drawing Sheets

(56)                    References Cited

U.S. PATENT DOCUMENTS

| 2022/0307244 A1* | 9/2022 | Ye | ........................... E03C 1/055 |
| 2024/0011264 A1* | 1/2024 | Ye | ........................... E03C 1/055 |

* cited by examiner

108 — Outlet Pipe

Metal Clip
120

128

106 — Outlet Pipe

126

170

Valve Nut
124

Valve

Zinc Body
110

Hose Retaining Plate
122

Manifold
102

Inlet Hoses
104

146

108

144

Mixing Chamber 162

Mixed Water Outlet

Hot Inlet          Cold Inlet

Mixing Chamber 162

Mixed Water Outlet

164

160

160

Mixing Chamber 162

124

Hot Inlet Cold Inlet 154A 154B

FAUCET ASSEMBLY WITH PLASTIC WATERWAY

CROSS-REFERENCE TO RELATED APPLICATIONS

This application is a U.S. national stage application under 35 U.S.C. § 371 of International Application No. PCT/US2022/077780, filed Oct. 7, 2022, which claims the priority of PCT International Application No. PCT/CN2021/122637, filed Oct. 8, 2021. The entire contents of each priority application is incorporated herein by reference.

FIELD

The present disclosure generally relates to faucet assemblies, and more particularly, to faucet assemblies having a plastic waterway.

BACKGROUND

Conventional plumbing fixtures and components include lead, if only trace amounts. Lead exposure can cause any of numerous health conditions, including anemia, weakness, and kidney or brain damage. High amounts of lead exposure can even cause death. However, not only is lead often found in water pipes, but it is even found in conventional faucet assemblies. For example, conventional faucet assemblies often include brass components, such as brass fittings or brass waterways. Brass is an alloy of copper and zinc, but often contains small amounts of lead as well.

SUMMARY

Provided herein are faucet assemblies having plastic waterways and plastic fittings. Thus, the faucet assemblies provided herein provide no lead (or brass) that the water could possibly come in contact with, providing a safer fixture. As explained above, conventional faucet assemblies typically include some amount of lead in the waterway, even if only trace amounts. However, any amount of lead exposure is undesirable. At sufficient quantities, lead exposure can cause significant health concerns, including, but not limited to, anemia, weakness, kidney or brain damage, and death. Accordingly, the faucet assemblies provided herein, which include plastic waterways as well as plastic fittings, eliminate the possibility of the water coming in contact with any lead to provide a safer faucet assembly relative to conventional faucet assemblies comprising lead and/or brass.

The plastic waterways of the faucet assemblies described are also significantly easier to manufacture and less expensive to produce than conventional metal (e.g., brass) waterways, as described below.

In some embodiments, the plastic waterway of a faucet assembly provided herein includes a plastic manifold. The plastic manifold may be manufactured using injection molding, and includes a hot water inlet leading to a hot water cavity, a cold water inlet leading to a cold water cavity, a hot water outlet, a cold water outlet, a mixed water inlet, and a mixed water outlet. The hot water inlet and cold water inlet are configured to receive hot water and cold water from a hot water supply and a cold water supply, respectively. The hot water outlet and cold water outlet can each be fluidly coupled to a hot water inlet and a cold water inlet of a mixing valve, respectively. Within the mixing valve, hot water is received from a hot water supply, via the hot water cavity of the plastic manifold and the hot water inlet of the mixing valve, and cold water is received from a cold water supply via the cold water cavity of the plastic manifold and the cold water inlet of the mixing valve. The mixing valve is controlled by a temperature control, which is controlled by a user. For example, in a manual faucet, the temperature control may be a handle. Based on the positioning of the handle, the mixing valve controls the amount of hot water relative to the amount of cold water that enters a mixing chamber from the hot water inlet and the cold water inlet of the mixing valve, respectively. Once the hot water and the cold water are mixed within the mixing chamber of the mixing valve, the mixed water can exit the mixing valve through a mixed water outlet and to a mixed water inlet of the plastic manifold. The mixed water continues to travel through a mixed water cavity of the plastic manifold, and out of the plastic manifold through a mixed water outlet. Once the mixed water exits the plastic manifold, it travels through an outlet pipe, to a faucet outlet, and is delivered to a user.

In some embodiments, the outlet pipe can include a plastic adaptor that is configured to connect to the plastic manifold by way of a female connector that is configured to couple to a male receiver by way of a snap fitting. In some embodiments, the plastic manifold is housed and at least a portion of the plastic adaptor of the outlet pipe is housed within a base (e.g., zinc body). In some embodiments, a portion of the outlet pipe is flexible. For example, a portion of the outlet pipe extending from the plastic adaptor portion of the outlet pipe to the faucet outlet may comprise a flexible material, such as a flexible polymer material.

In some embodiments, provided is a faucet assembly, the faucet assembly comprising: a plastic manifold comprising a hot water inlet, a cold water inlet, a hot water outlet, a cold water outlet, a mixed water inlet, and a mixed water outlet; a mixing valve comprising a hot water inlet, a cold water inlet, a mixing chamber, and a mixed water outlet, wherein the hot water inlet is fluidly connected to the hot water outlet of the plastic manifold and the cold water inlet is fluidly connected to the cold water outlet of the plastic manifold, and the mixed water outlet is fluidly connected to the mixed water inlet of the plastic manifold; and a plastic outlet pipe comprising a water inlet, wherein the water inlet is fluidly connected to the mixed water outlet of the plastic manifold.

In some embodiments of the faucet assembly, the faucet assembly comprises no brass or lead components.

In some embodiments of the faucet assembly, the plastic manifold comprises polyphenylene sulfide.

In some embodiments of the faucet assembly, the plastic manifold is configured to couple to a cold water inlet hose and a hot water inlet hose such that the cold water inlet hose is fluidly connected to the cold water inlet and the hot water inlet hose is fluidly connected to the hot water inlet.

In some embodiments of the faucet assembly, the outlet pipe comprises a plastic adaptor portion.

In some embodiments of the faucet assembly, the plastic adaptor portion comprises polyethylene.

In some embodiments of the faucet assembly, the outlet pipe comprises a plastic flexible portion.

In some embodiments of the faucet assembly, the plastic flexible portion comprises polyethylene.

In some embodiments of the faucet assembly, the plastic flexible portion is housed within a faucet body and comprises a water outlet connected to a faucet outlet, wherein the faucet outlet is configured to dispense mixed water from the faucet assembly and into a sink basin.

In some embodiments of the faucet assembly, the plastic flexible portion is configured to rotate relative to the plastic adaptor portion.

In some embodiments of the faucet assembly, the faucet assembly is configured to receive cold water from a cold water supply at the cold water inlet of the plastic manifold, through a cold water cavity and the cold water outlet of the plastic manifold, the cold water inlet of the mixing valve, and to the mixing chamber, and the faucet assembly is configured to receive hot water from a hot water supply at the hot water inlet of the plastic manifold, through a hot water cavity and the hot water outlet of the plastic manifold, the hot water inlet of the mixing valve, and to the mixing chamber, where the hot water is mixed with the cold water to form mixed water.

In some embodiments of the faucet assembly, the faucet assembly is configured to dispense, at a faucet outlet, the mixed water received from the mixing chamber by way of the mixed water outlet of the mixing valve, the mixed water inlet of the plastic manifold, a mixed water cavity, the mixed water outlet of the plastic manifold, the water inlet of the outlet pipe, and through the outlet pipe to the faucet outlet.

In some embodiments of the faucet assembly, the plastic outlet pipe is configured to connect to the plastic manifold using a snap-fitting.

In some embodiments of the faucet assembly, the connection between the plastic flexible portion and the plastic adaptor portion includes a metal clip.

In some embodiments of the faucet assembly, the plastic manifold is housed within a zinc body.

In some embodiments of the faucet assembly, the faucet assembly comprises no threaded connections between any two components.

In some embodiments, a plastic manifold for a faucet assembly is provided, the plastic manifold comprising: a hot water cavity configured to receive hot water from a hot water source by way of a hot water inlet; a hot water outlet in fluid communication with the hot water cavity; a cold water cavity configured to receive cold water from a cold water source by way of a cold water inlet, a cold water outlet in fluid communication with the hot water cavity; a mixed water cavity configured to receive mixed water by way of a mixed water inlet; and a mixed water outlet in fluid communication with the mixed water cavity, wherein the hot water inlet is configured to couple to a hot water inlet hose, the cold water inlet is configured to couple to a cold water inlet hose, the hot water outlet and cold water outlet are configured to couple to a mixing valve, and the mixed water inlet is configured to couple to the mixing valve such that the mixed water cavity is configured to receive mixed water from the mixing valve.

In some embodiments of the plastic manifold, the mixed water outlet is configured to couple to a plastic outlet pipe of the faucet assembly.

In some embodiments of the plastic manifold, the plastic manifold comprises no brass or lead components.

In some embodiments of the plastic manifold, the plastic manifold comprises polyphenylene sulfide.

In some embodiments of the plastic manifold, the plastic manifold is configured to couple to a plastic adaptor portion of the plastic outlet pipe.

In some embodiments of the plastic manifold, the plastic adaptor portion comprises polyethylene.

In some embodiments of the plastic manifold, the plastic outlet pipe comprises a plastic flexible portion.

In some embodiments of the plastic manifold, the plastic flexible portion comprises polyethylene.

In some embodiments of the plastic manifold, the mixed water comprises hot water and cold water mixed within a mixing chamber of the mixing valve.

In some embodiments of the plastic manifold, the plastic outlet pipe is configured to connect to the plastic manifold using a snap-fitting.

In some embodiments of the plastic manifold, the plastic manifold is housed within a zinc body.

In some embodiments of the plastic manifold, the plastic manifold comprises no threaded connections.

In some embodiments, a plastic adaptor portion for a faucet assembly is provided, the plastic adaptor portion comprising: a mixed water inlet; a mixed water outlet opposite the mixed water inlet; and a sidewall extending between the mixed water inlet and the mixed water outlet, wherein the mixed water inlet comprises a male connector configured to couple to a mixed water outlet comprising a male connector of a plastic manifold of a faucet assembly, and the mixed water outlet comprises a female connector configured to receive a male connector of a plastic flexible portion of an outlet pipe of a faucet assembly.

In some embodiments of the plastic adaptor portion, the plastic adaptor portion comprises no brass or lead components.

In some embodiments of the plastic adaptor portion, the plastic adaptor portion comprises polyethylene.

In some embodiments of the plastic adaptor portion, the plastic adaptor portion is configured to connect to the plastic manifold using a snap-fitting.

In some embodiments of the plastic adaptor portion, the plastic adaptor portion is configured to connect to the plastic flexible portion using a metal clip.

In some embodiments of the plastic adaptor portion, the plastic adaptor portion comprises no threaded connections between any two components.

In some embodiments, a plastic manifold and plastic adaptor portion assembly for a faucet assembly is provided, the plastic manifold and plastic adaptor portion assembly comprising: a plastic manifold comprising a mixed water outlet; and a plastic adaptor portion comprising a mixed water inlet, wherein the plastic manifold and the plastic adaptor portion are connected using a snap fitting such that the mixed water outlet of the plastic manifold is in fluid communication with the mixed water inlet of the plastic adaptor portion.

In some embodiments of the plastic manifold and plastic adaptor portion assembly, the plastic manifold and plastic adaptor portion assembly comprises no brass or lead components.

In some embodiments of the plastic manifold and plastic adaptor portion assembly, wherein the plastic manifold and plastic adaptor portion assembly comprises no threaded connections.

In some embodiments of the plastic manifold and plastic adaptor portion assembly, the plastic manifold comprises polyphenylene sulfide.

In some embodiments of the plastic manifold and plastic adaptor portion assembly, the plastic manifold is configured to couple to a cold water inlet hose and a hot water inlet hose such that the cold water inlet hose is fluidly connected to a cold water inlet and the hot water inlet hose is fluidly connected to a hot water inlet.

In some embodiments of the plastic manifold and plastic adaptor portion assembly, the plastic adaptor portion comprises polyethylene.

In some embodiments of the plastic manifold and plastic adaptor portion assembly, the plastic adaptor portion is configured to couple to a plastic flexible portion of an outlet pipe of a faucet assembly.

In some embodiments of the plastic manifold and plastic adaptor portion assembly, when the plastic adaptor portion is connected to a plastic flexible portion, the plastic flexible portion is configured to rotate relative to the plastic adaptor portion.

In some embodiments of the plastic manifold and plastic adaptor portion assembly, when the plastic adaptor portion is connected to a plastic flexible portion, the connection between the plastic flexible portion and the plastic adaptor portion includes a metal clip.

In some embodiments, any one or more of the features, characteristics, or elements discussed above with respect to any of the embodiments may be incorporated into any of the other embodiments mentioned above or described elsewhere herein.

DETAILED DESCRIPTION

Figure 1B:
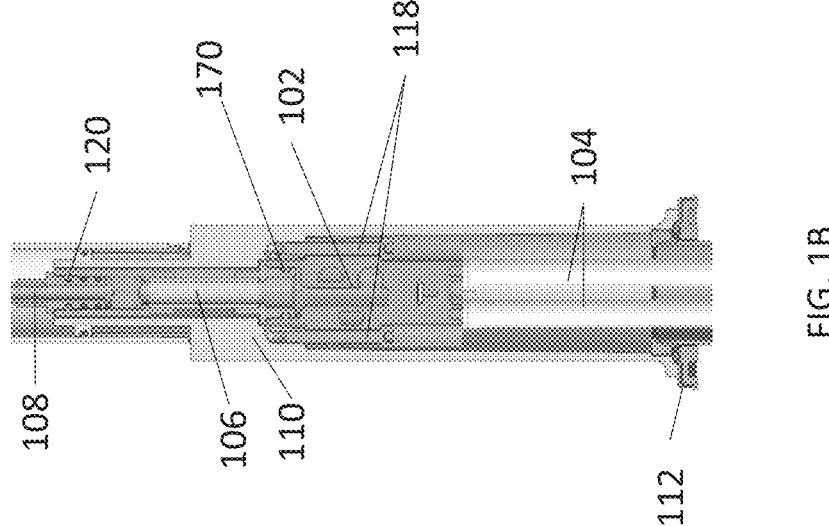
FIG. 1B shows a cross-sectional view of a plastic waterway of a faucet assembly, according to some embodiments.

Described herein are faucet assemblies having plastic waterways. The faucet assemblies provided herein may also include plastic fittings and connection components, such that the entire waterway of the faucet assembly is lead-free. In some embodiments, the entire faucet assembly is lead-free. As explained above, many conventional faucet assemblies comprise some amount of lead in the waterway, which can be introduced to a user and cause significant health concerns including, but not limited to, anemia, weakness, kidney or brain damage, and death. However, the faucet assemblies provided herein provide no amount of lead in the waterway. Thus, the faucet assemblies described are significantly safer than conventional faucet assemblies.

The faucet assemblies provided herein include a plastic waterway in the form of a plastic manifold. The plastic manifold includes cavities for hot water and cold water to be received from a hot water supply and a cold water supply, respectively, and a cavity for mixed water. The hot and cold water received from the hot and cold water supplies are delivered to a mixing valve. The mixing valve includes a mixing chamber that mixes the hot and cold water in a proportion consistent with a temperature control to achieve a user-determined mixed water temperature. The mixed water travels from the mixing chamber out of the mixing valve and into the plastic waterway through the mixed water cavity. From there, the mixed water travels out of the plastic waterway to an outlet pipe, and is delivered to a user out of a faucet outlet.

The outlet pipe can comprise two portions: a plastic adaptor portion and a plastic flexible portion. The plastic adaptor portion is coupled to the plastic manifold of the faucet assembly. In some embodiments, the plastic adaptor is configured to attach to the plastic manifold using a snap fitting, wherein the plastic adaptor comprises a female connector portion that snaps into a male connector portion of the plastic waterway.

The plastic flexible portion is coupled to the plastic adaptor portion and a faucet outlet of the faucet assembly. Thus, the plastic flexible portion is configured to transfer water from the plastic adaptor portion out of the faucet assembly. In some embodiments, the plastic flexible portion comprises a female connector portion that is configured to connect to a male connector portion of the plastic adaptor portion of the outlet pipe. The connection between the plastic flexible portion and the plastic adaptor portion may be held in place using a metal clip. In some embodiments, the plastic flexible portion of the outlet pipe is configured to twist relative to a stationary plastic adaptor portion. This twisting motion allows a user to pivot the faucet body of the faucet assembly relative to a mounting point (e.g., the point at which the faucet body mounts to a countertop of a sink) such that the user can adjust the location of the faucet body and thus, the faucet outlet (e.g., spray head) of the faucet assembly relative to the mounting point and the sink basin.

Referring now to the drawings, like parts are marked throughout the specification and drawings with the same reference numerals, respectively.

Figure 1A:
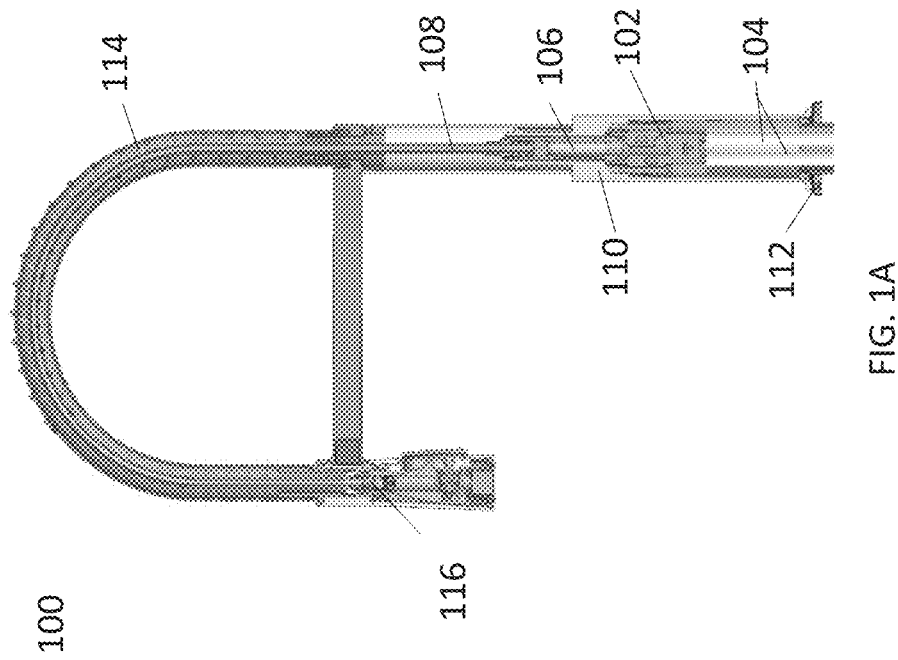
FIG. 1A shows a side cross-sectional view of a faucet assembly having a plastic waterway, according to some embodiments.

FIG. 1A shows a side cross-sectional view of a faucet assembly 100 having a plastic waterway, and FIG. 1B shows a cross-sectional view of a plastic waterway of a faucet assembly according to some embodiments. As shown in the figures, faucet assembly 100 can include a plastic manifold 102, inlet hoses 104, a plastic adaptor portion 106 of an outlet pipe, a plastic flexible portion 108 of an outlet pipe, a base 110, a mount 112, a faucet body 114, a faucet outlet 116, and one or more O-rings 170.

In some embodiments, plastic manifold 102 may be configured to be housed by base 110 above mount 112 and below plastic adaptor 106. In some embodiments, plastic manifold 102 may be manufactured using injection molding. Plastic manifold 102 may be formed from polymers including engineering thermoplastics including Acrylonitrile butadiene styrene (ABS), Nylon 6, Nylon 6-6, Polyamides (PA), Polybutylene terephthalate (PBT), Polycarbonates (PC), Polyetheretherketone (PEEK), Polyetherketoneketone (PEKK), Polyetherketone (PEK), Polyketone (PK), Polyethylene terephthalate (PET), Polyimides, Polyoxymethylene plastic (POM/Acetal), Polyphenylene sulfide (PPS), Polyphenylene oxide (PPO), Polysulphone (PSU), Polytetrafluoroethylene (PTFE/Teflon), Poly(methyl methacrylate) (PMMA)—and co-polymers and blends thereof. In some embodiments, plastic manifold 102 may be attached to the base 110 without the use of a thread connector. For example, plastic manifold 102 may be pressed into its proper place in the base 110. In some embodiments, plastic manifold 102 may be fixed to the base 110 using a plurality of screws 118. As shown in FIG. 1B, the plurality of screws 118 may include at least two screws. In some embodiments, the plurality of screws 118 may include at least one screw or at least three screws.

Plastic manifold 102 forms a plastic waterway in faucet assembly 100. Plastic manifold 102 may include water inlets configured to connect to inlet hoses 104. Water inlets may include a hot water inlet and a cold water inlet. Inlet hoses 104 may be in fluid communication with one or more water supplies (e.g. a hot water supply and a cold water supply). Inlet hoses 104 may be configured to attach to plastic manifold 102 without the use of metal connectors or fittings. Once connected to a water supply via the inlet hoses 104, faucet assembly 100 is configured such that water may travel through the inlet hoses 104 from the water supply and into plastic manifold 102.

Plastic manifold 102 may contain a plurality of water cavities in fluid communication with the aforementioned water inlets. In some embodiments, water cavities may include a hot water cavity and a cold water cavity. In some embodiments, water cavities may include water outlets which may be fluidly coupled to a mixing valve. In some embodiments, water outlets that are fluidly coupled to a mixing valve may include a hot water outlet from the hot water cavity of the plastic manifold 102 and a cold water outlet from the cold water cavity of plastic manifold 102. The mixing valve may be configured to receive hot water from a hot water supply via a hot water cavity in plastic manifold 102 as well as cold water from a cold water supply via a cold water cavity in plastic manifold 102. The mixing valve may mix hot and cold water to form mixed water of an appropriate temperature based on user input (e.g., based on how a user positions a faucet handle). The mixing valve may contain a mixed water outlet fluidly coupled to a mixed water inlet in plastic manifold 102. A mixed water inlet may be fluidly connected to a mixed water cavity in plastic manifold 102. Plastic manifold 102 may include a mixed water outlet configured to allow water to exit the plastic manifold 102 and enter a faucet outlet pipe.

In some embodiments, plastic manifold 102 connects to an outlet pipe via the plastic adaptor portion 106 of the outlet pipe. The plastic adaptor portion 106 may provide a fluid connection between plastic manifold 102 and faucet body 114. The plastic adaptor portion 106 of the outlet pipe may be configured to attach to plastic manifold 102 without the use of metal (e.g., lead, brass) fittings or connectors. For example, in some embodiments, the plastic adaptor portion 106 of the outlet pipe may comprise a female connector configured to snap into a male connector of plastic manifold 102. Again, such a configuration significantly reduces risk of lead exposure, since no waterway of the faucet assembly includes lead. This means that at no point throughout the faucet assembly does the water passing through come in contact with any lead. In some embodiments, the plastic adaptor portion 106 of the outlet pipe may include a water inlet configured to receive water from a mixed water outlet of plastic manifold 102 at a water inlet. In some embodiments, the plastic adaptor portion 106 of the outlet pipe may include a water outlet coupled to the plastic flexible portion 108 of the outlet pipe. The plastic adaptor portion 106 may comprise thermoplastic polymer including polyolefins, for example polyethylene (PE), polypropylene (PP), or blends or copolymers thereof-polyethylene includes cross-linked polyethylene, linear low-density polyethylene (LLDPE), high density polyethylene (HDPE). For example, one suitable material for plastic adaptor portion 106 may include DOWLEX™ 2388 polyethylene.

The plastic flexible portion 108 of the outlet pipe may be housed by the faucet body 114. In some embodiments, the plastic flexible portion 108 of the outlet pipe may comprise a female connector configured to connect to a male connector of the plastic adaptor portion 106 of the outlet pipe. In some embodiments, as shown in FIG. 1B, a metal clip 120 may secure the connection between the plastic flexible portion 108 of the outlet pipe and plastic adaptor portion 106 of the outlet pipe. The plastic flexible portion 108 of the outlet pipe may comprise a water inlet fluidly coupled to a water outlet in the plastic adaptor portion 106 of the outlet pipe. The plastic flexible portion 108 of the outlet pipe may include a water outlet fluidly coupled to faucet outlet 116.

In some embodiments, the plastic flexible portion 108 of the outlet pipe may be formed from plastics including thermoplastic polymers such as polyolefins, for example polyethylene (PE), polypropylene (PP), or blends or copolymers thereof—polyethylene includes cross-linked polyethylene, linear low-density polyethylene (LLDPE), high density polyethylene (HDPE). The plastic flexible portion 108 of the outlet pipe may also be formed from plastics such as nylon, polyurethane, polypropylene, polyvinylchloride (PVC), ethylene vinyl acetate (EVA), or a thermoplastic elastomer (TPE), or blends or copolymers thereof. In some embodiments, faucet outlet 116 may be housed in a detachable spray head and the plastic flexible portion 108 of the outlet pipe may be configured to expand when the detachable head is detached. As used herein, a detachable spray head can include a spray head of a pull-out faucet that may be removably docked at a faucet spout. In some embodiments, the spray head may be a fixed spray head.

In some embodiments, the plastic adaptor portion 106 of the outlet pipe may be configured to be stationary and the plastic flexible portion 108 may be configured to rotate relative to the plastic adaptor portion 106 of the outlet pipe. This rotation may allow users to pivot faucet body 114, thereby adjusting the position of faucet outlet 116 relative to a sink basin to which faucet assembly 100 delivers water.

In some embodiments, base 110 may be formed out of zinc. In some embodiments, base 110 may comprise a male connector configured to connect to a female connector of faucet body 114. In some embodiments, base 110 and faucet body 114 may constitute two sections of a single, continuous assembly. In some embodiments, the faucet body 114 can rotate relative to the base 110, which remains stationary.

In some embodiments, faucet assembly 100 may be included as part of a larger sink assembly. In some embodiments, mount 112 may be configured to affix faucet assembly 100 to an existing surface (e.g., a countertop) surrounding an existing basin (e.g., a sink).

Figure 1C:
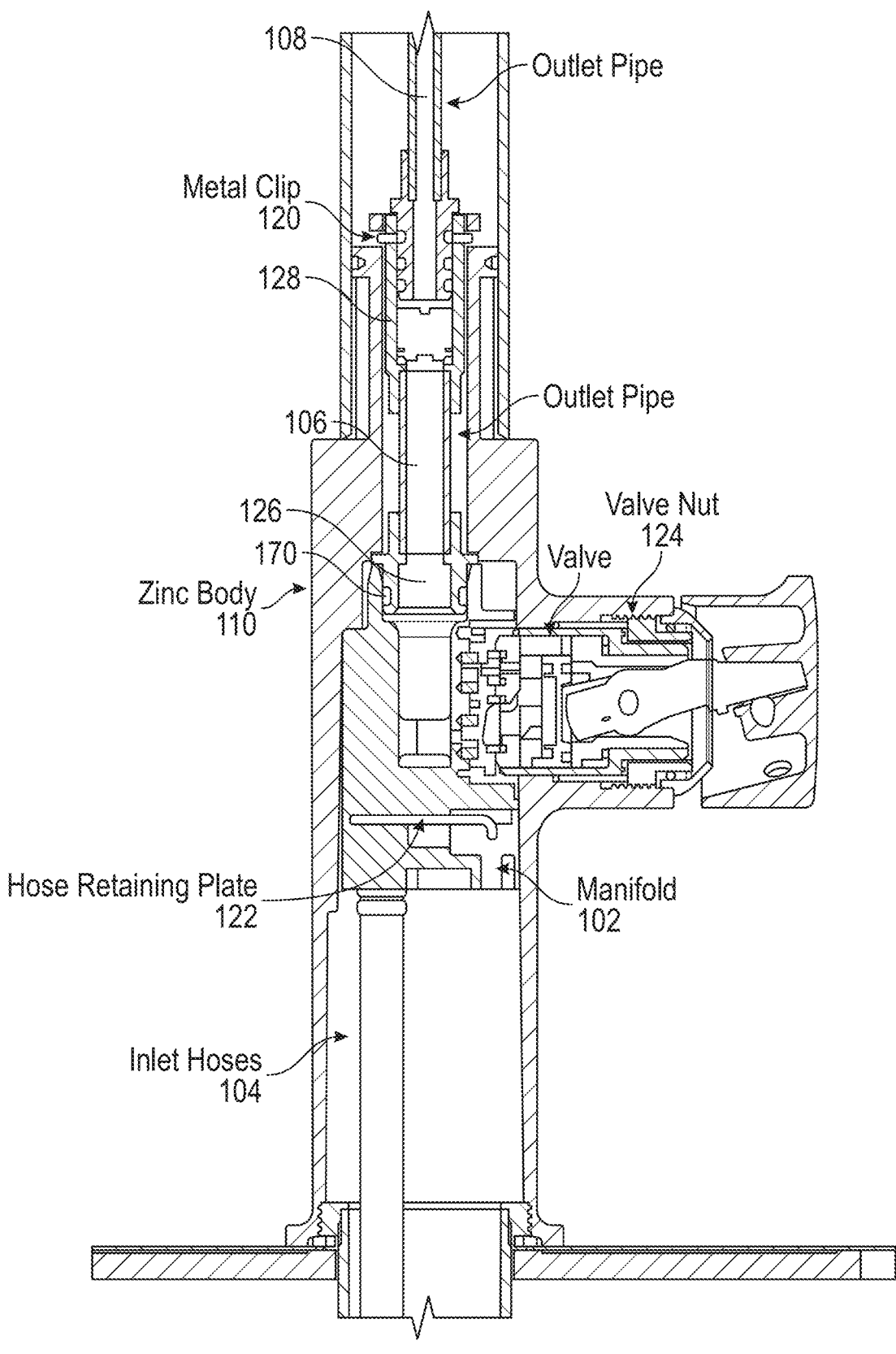
FIG. 1C shows a cross-sectional view of a plastic waterway coupled to a mixing valve within a faucet assembly, according to some embodiments.

FIG. 1C shows a cross-sectional view of a portion of a faucet assembly showing plastic manifold 102 of a plastic waterway coupled to a mixing valve 124, according to some embodiments. As shown, this portion of a faucet assembly includes plastic manifold 102, a hose retaining plate 122 that holds inlet hoses 104 to plastic manifold 102, mixing valve 124, base 110, plastic adaptor portion 106 of an outlet pipe, plastic flexible portion 108 of an outlet pipe, metal clip 120 that couples plastic flexible portion 106 to plastic adaptor portion 104, and one or more O-rings 170.

Plastic manifold 102, inlet hoses 104, mixing valve 124, and plastic adaptor portion 106 of the outlet pipe may be housed inside base 110. Plastic manifold 102 may be configured to connect to inlet hoses 104. In some embodiments, inlet hoses 104 may be secured to plastic manifold 102 by hose retaining plate 122. Hose retaining plate 122 may help avert water leaks by preventing the connection between inlet hoses 104 and plastic manifold 102 from coming loose.

Inlet hoses 104 may be configured to connect to at least one water supply. In some embodiments, inlet hoses 104 may include a hot water inlet hose connected to a hot water supply and a cold water inlet hose connected to a cold water supply. Inlet hoses 104 may include water outlets fluidly coupled to water inlets in plastic manifold 102. In some embodiments, plastic manifold 102 may include a hot water inlet fluidly coupled to a hot water inlet hose and a cold water inlet fluidly coupled to a cold water inlet hose. The water inlets may connect to water cavities within plastic manifold 102. In some embodiments, a hot water inlet may connect to a hot water cavity within plastic manifold 102, and a cold water inlet may connect to a cold water cavity within plastic manifold 102.

Mixing valve 124 may be configured to receive, to an internal mixing chamber, hot water from a hot water cavity within plastic manifold 102 and cold water from a cold water cavity within plastic manifold 102. The hot water and cold water may be transferred to a hot water outlet and a cold water outlet of plastic manifold 102 from the hot water cavity and cold water cavity of plastic manifold 102, respectively. The water may then flow from the hot water outlet and a cold water outlet of plastic manifold 102 to a hot water inlet and a cold water inlet of mixing valve 124, wherein the hot water outlet and cold water outlet of plastic manifold 102 are fluidly connected to the hot water inlet and the cold water inlet of mixing valve 124, respectively. From the hot water inlet and cold water inlet of mixing valve 124, the hot and cold water can flow into a mixing chamber of mixing valve 124. The relative amounts of hot and cold water that flow into the mixing chamber of mixing valve 124 may be controlled with a temperature control. In some embodiments, the temperature control of mixing valve 124 may be an adjustable faucet handle. In this case, a user may control the mixing valve 124 by adjusting the position of the faucet handle. In some embodiments, the temperature control of mixing valve 124 may include a hot water knob and a cold water knob. In this case, a user may control the mixing valve 124 by twisting one or both of the knobs. In some embodiments, mixing valve 124 may be a solenoid valve. For example, a solenoid valve may be used in the case of an automatic faucet assembly. Mixing valve 124 may include a mixed water outlet fluidly coupled to the mixing chamber configured to transfer mixed water from the mixing chamber of mixing valve 124 to a mixed water inlet in plastic manifold 102. A mixed water inlet in plastic manifold 102 may connect to a mixed water cavity within plastic manifold 102 that is configured to receive mixed water from the mixing chamber in mixing valve 124. The mixed water cavity within plastic manifold 102 may be coupled to a mixed water outlet configured to facilitate the flow of water out of plastic manifold 102 and into the outlet pipe.

As shown, mixing valve 124 may be positioned horizontally and perpendicular relative to plastic manifold 102. Cold water can flow horizontally from the cold water outlet of plastic manifold 102 to the cold water inlet of mixing valve 124, and hot water can flow horizontally from the hot water outlet of plastic manifold 102 to the hot water inlet of mixing valve 124. Similarly, mixed water can flow horizontally from the mixed water outlet of mixing valve 124 to the mixed water inlet of plastic manifold 102.

One end of the plastic adaptor portion 106 of the outlet pipe may include a male connector 126 configured to snap into a female connector of plastic manifold 102. Another end of the plastic adaptor portion 126 of the outlet pipe may include a female connector 128 configured to receive a male connector of the plastic flexible portion 108 of the outlet pipe. In some embodiments, the connection between the plastic adaptor portion 106 of the outlet pipe and the plastic flexible portion 108 of the outlet pipe may be secured by metal clip 120.

Figure 1D:
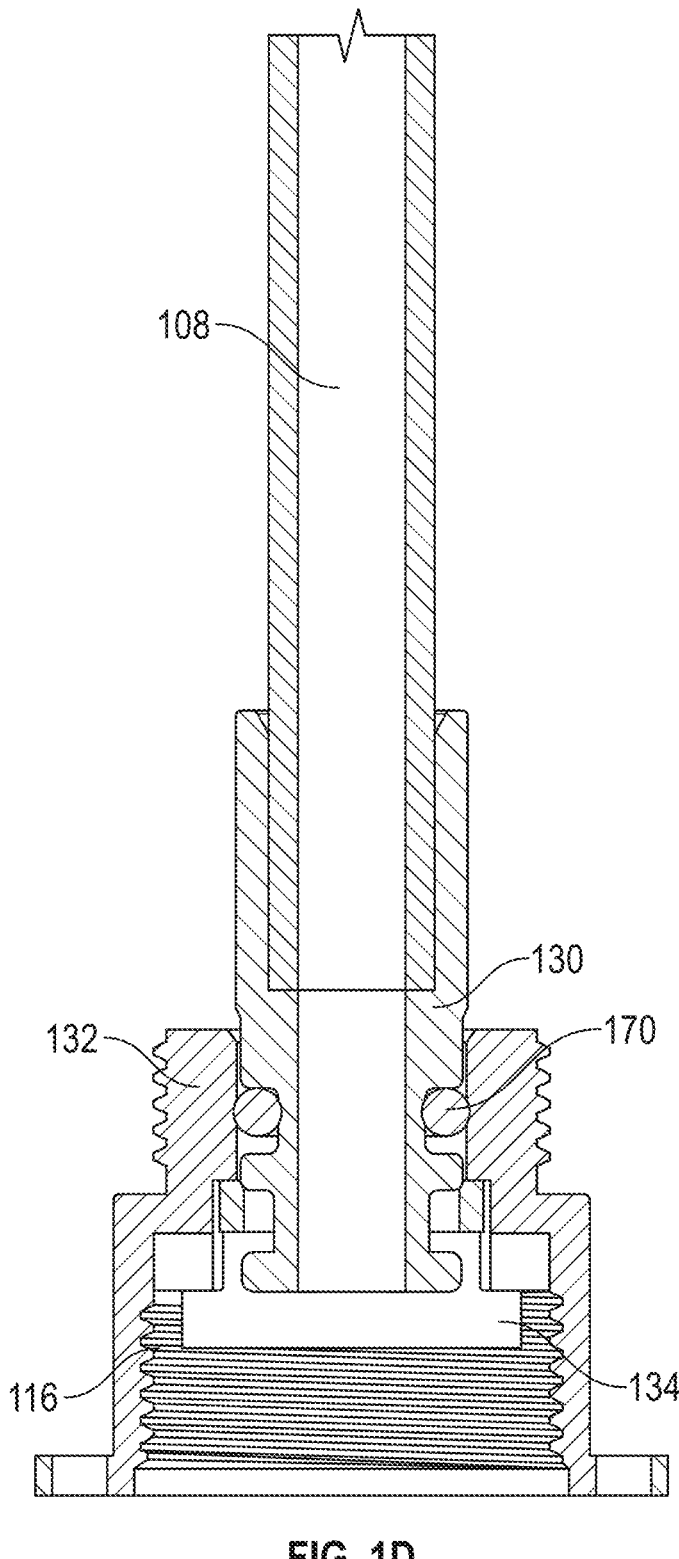
FIG. 1D shows a portion of an outlet pipe coupled to a faucet outlet of a faucet assembly, according to some embodiments.

FIG. 1D shows a segment of plastic flexible portion 108 of an outlet pipe coupled to a faucet outlet 116 of a faucet assembly, according to some embodiments.

The plastic flexible portion 108 of the outlet pipe may comprise a male connector configured to connect to a female connector 132 of faucet outlet 116. In some embodiments, the connection between the plastic flexible portion 108 of the outlet pipe and the faucet outlet 116 may be secured with a plastic adaptor 130. In some embodiments, plastic adaptor 130 may be formed from polyethylene or polyethylene, glass filled. Faucet outlet 116 may include a washer 134 to prevent leaks. In some embodiments, washer 134 may be a rubber O-ring washer. In some embodiments, faucet outlet 116 may be configured to allow users to selectively detach a faucet head. The coupling between plastic flexible portion 108 and faucet outlet 116 may include one or more O-rings, such as that of O-ring 170.

Figure 1E:
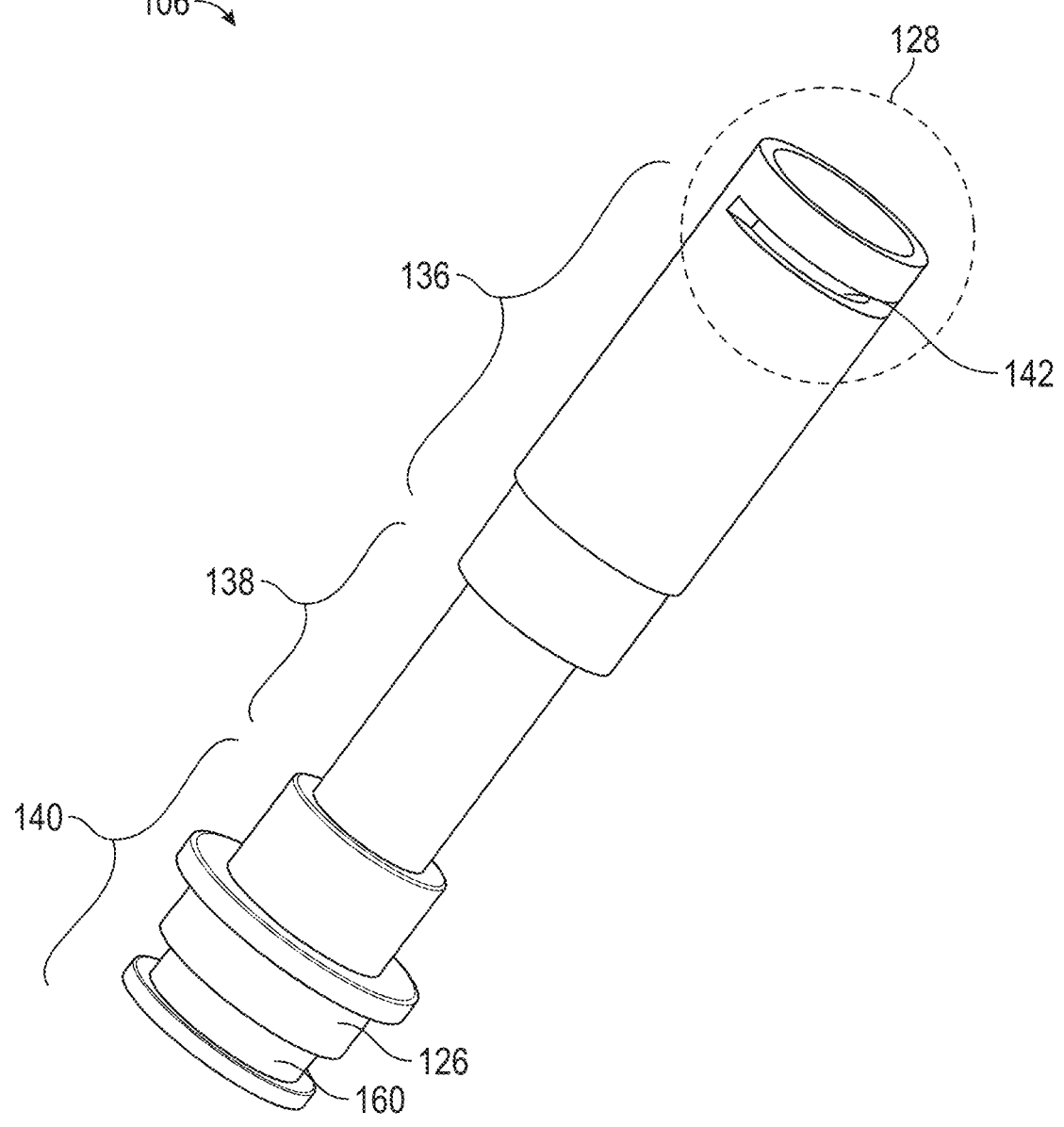
FIG. 1E shows a perspective view of a plastic adaptor portion of an outlet pipe, according to some embodiments.

FIG. 1E shows a perspective view of a plastic adaptor portion 106 of an outlet pipe, according to some embodiments. As shown, the plastic adaptor portion 106 of the outlet pipe comprises three portions: a top portion 136, a middle portion 138, and a bottom portion 140. The descriptive terms "top," "middle," and "bottom" refer to relative locations of each portion when the faucet assembly is mounted on a horizontal surface (e.g., a countertop).

In some embodiments, the plastic adaptor portion 106 may have a total height of 40-300 mm. In some embodiments, the total height of the plastic adaptor portion 106 may be less than or equal to 300, 280, 260, 240, 220, 200, 180, 160, 140, 120, 100, 80, or 60 mm. In some embodiments, the total height of the plastic adaptor portion 106 may be greater than or equal to 40, 60, 80, 100, 120, 140, 160, 180, 200, 220, 240, 260, or 280 mm. In some embodiments, the water inlet at bottom portion 140 may comprise an inner diameter of 4-20 mm. In some embodiments, the water inlet at bottom portion 140 may comprise an inner diameter of less than or equal to 20, 18, 16, 14, 12, 10, 8, or 6 mm. In some embodiments, the water inlet at bottom portion 140 may comprise an inner diameter of greater than or equal to 4, 6, 8, 10, 12, 14, 16, or 18 mm. In some embodiments, the water outlet at top portion 136 may comprise an inner diameter of 4-20 mm. In some embodiments, the water outlet at top portion 136 may comprise an inner diameter of less than or equal to 20, 18, 16, 14, 12, 10, 8, or 6 mm. In some embodiments, the water outlet at top portion 136 may comprise an inner diameter of greater than or equal to 4, 6, 8, 10, 12, 14, 16, or 18 mm. In some embodiments, middle portion 138 may comprise an inner diameter of 2-20 mm. In some embodiments, middle portion 138 may comprise an inner diameter of less than or equal to 20, 18, 16, 14, 12, 10, 8, 6, or 4 mm. In some embodiments, middle portion 138 may comprise an inner diameter of greater than or equal to 2, 4, 6, 8, 10, 12, 14, 16, or 18 mm. In some embodiments, the middle portion 138 may be smaller in diameter than the top portion 136 and/or the bottom portion 140, as shown in FIG. 1E.

Top portion 136 may include a female connector 128 configured to receive a male connector of a plastic flexible portion of the outlet pipe. Female connector 128 may comprise partially circumferential slot 142 configured to receive a metal clip to secure a male connector of a plastic flexible portion to the female connector of the plastic adaptor portion.

In some embodiments, the bottom portion 140 may be configured to attach to a plastic manifold via a snap-fitting. In some embodiments, the bottom portion 140 may include a male connector 126 configured to snap into a female connector of a plastic manifold. Ale connector 126 may include a groove 160 configured to receive an O-ring. An O-ring may be used to provide a tight (e.g., watertight) seal between plastic manifold 102 and plastic adaptor portion 06.

Figure 1F:
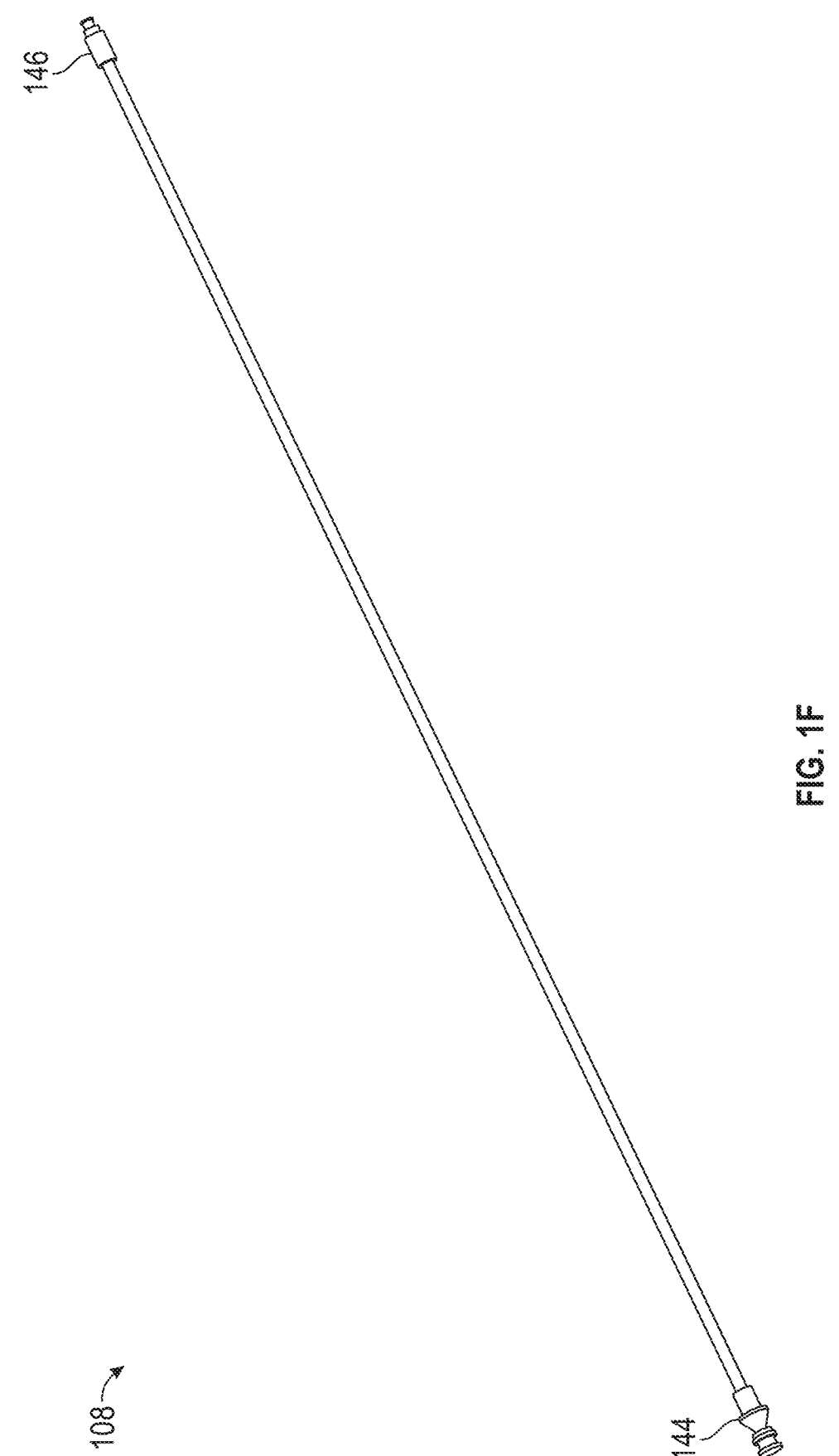
FIG. 1F shows a flexible portion of an outlet pipe, according to some embodiments.

FIG. 1F shows a plastic flexible portion 108 of an outlet pipe, according to some embodiments. As shown, a first end 144 is configured to couple to a plastic adaptor portion of an outlet pipe (e.g., plastic adaptor portion 406 of FIG. 1E) and a second end 146 is configured to couple to a faucet outlet of a faucet assembly.

The first end 144 may include a circumferential cut-out configured to receive a metal clip. The metal clip (e.g., metal clip 220 of FIG. 1C) may be configured to secure first end 144 of plastic flexible portion 108 to a plastic adaptor portion (e.g., plastic adaptor portion 406 of FIG. 1E) of a faucet assembly provided herein. The second end 146 may include a male connector configured to be received by a female connector of a faucet outlet (e.g., female connector 332 shown in FIG. 1D).

Figure 1G:
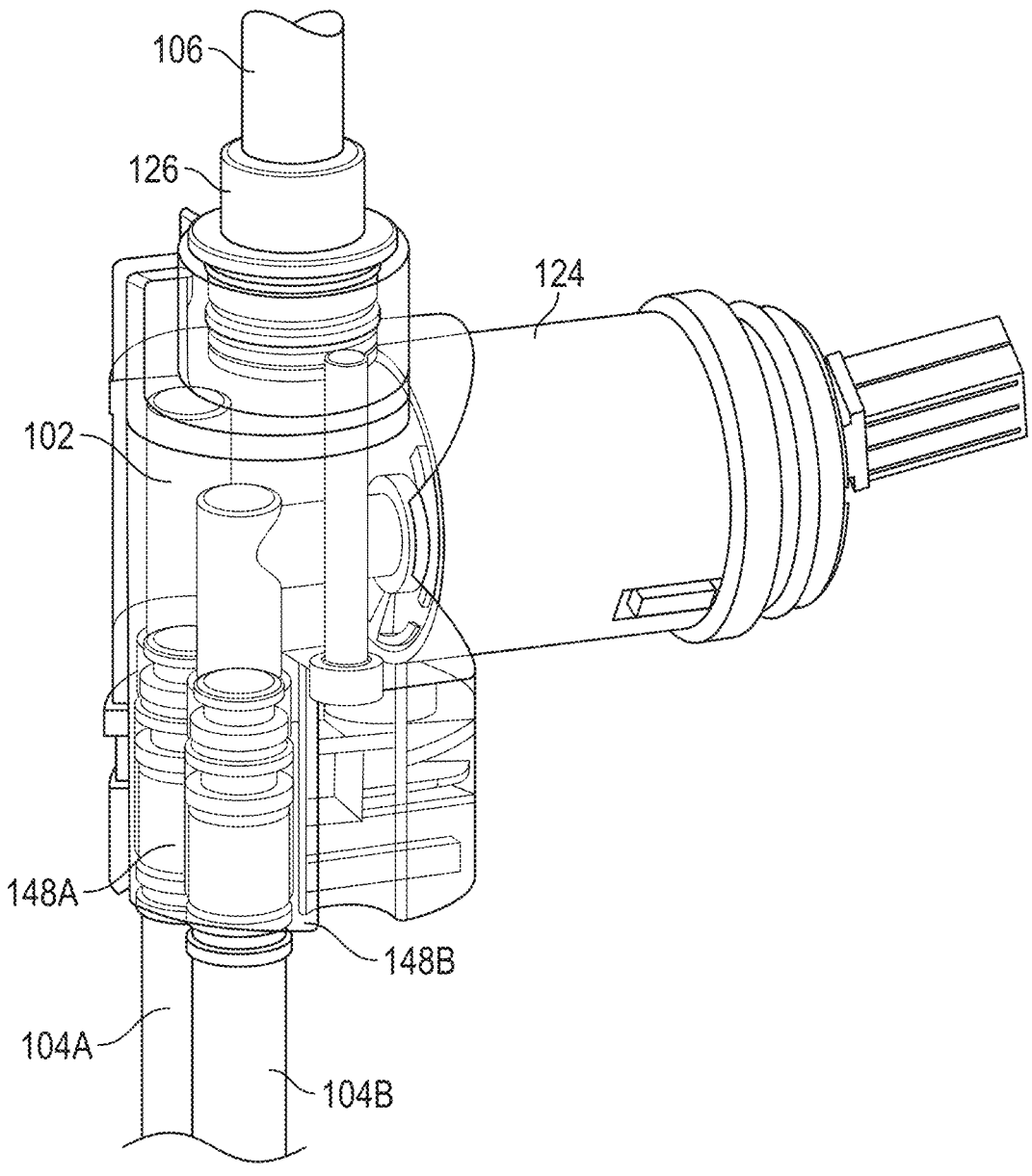
FIG. 1G shows a perspective view of a plastic manifold, according to some embodiments.
Figure 1H:
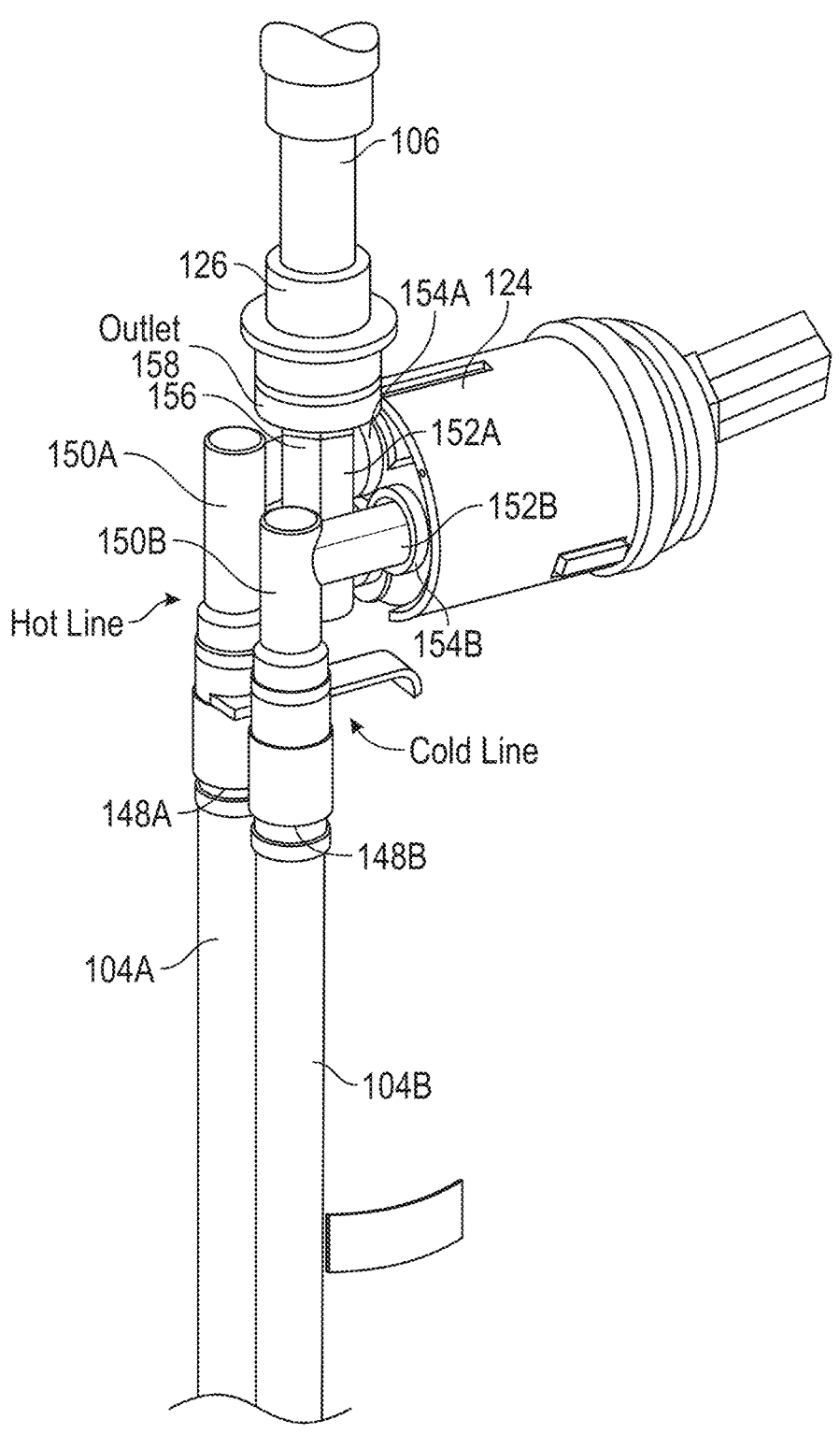
FIG. 1H shows the internal flow paths of a plastic waterway of a faucet assembly, according to some embodiments.

FIG. 1G shows a perspective view of a portion of a faucet assembly, and FIG. 1H shows the internal flow paths of a faucet assembly, according to some embodiments. Specifically, FIGS. 1G and/or 1H show plastic manifold 102 with hot water inlet 148A, cold water 148B, hot water cavity 150A, cold water cavity 150B, hot water outlet 152A, cold water outlet 152B, mixing valve 124, mixed water cavity 156, and mixed water outlet 158. In FIGS. 1G and 1H, mixed water outlet 158 is shown to be connected on one end to hot water inlet hose 104A and cold water inlet hose 104B and on another end to a plastic adaptor portion 106 of an outlet pipe which includes a female connector 126.

Hot water inlet 148A may be configured to connect to hot water inlet hose 104A and receive hot water from a hot water supply via hot water inlet hose 104A. Likewise, cold water inlet 148B may be configured to connect to cold water inlet hose 104B and receive cold water from a cold water supply via cold water inlet hose 104B. Hot water inlet hose 104A and cold water inlet hose 104B may be in fluid communication with hot and cold water supplies, respectively. Hot water inlet 148A may be fluidly coupled to hot water cavity 150A within plastic manifold 102, and cold water inlet 148B may be fluidly coupled to cold water cavity 150B within plastic manifold 102. Hot water cavity 150A may be fluidly coupled to hot water outlet 152A of plastic manifold 102 and cold water cavity 150B may be fluidly coupled to cold water outlet 152B of plastic manifold 102. Hot water outlet 152A may be fluidly coupled to a hot water inlet 152A of mixing valve 124 and cold water outlet 152B may be fluidly coupled to a cold water inlet 152B of mixing valve 124.

Mixing valve 124 may be configured to receive hot water from hot water inlet 154A and cold water from cold water inlet 154B. The hot water and cold water received by mixing valve 124 may enter the hot water inlet 154A and cold water inlet 154B, respectively, and pass to a mixing chamber of mixing valve 124, where the hot water and cold water mix together to form mixed water having a mixed water temperature. From the mixing chamber of mixing valve 124, the mixed water is transferred to a mixed water outlet of mixing valve 124, to a mixed water inlet of plastic manifold 102, and to a mixed water cavity 156 of plastic manifold 102.

In some embodiments, mixed water cavity 156 may be configured to transfer water out of plastic manifold 102 via mixed water outlet 158. Plastic manifold 102 may comprise a female connector located above mixed water outlet 158 that is configured to receive a male connector 126 of a plastic adaptor portion 106 of an outlet pipe. In some embodiments, male connector 126 may be configured to connect to a female connector of plastic manifold 102 with a snap-fitting.

Figure 1J:
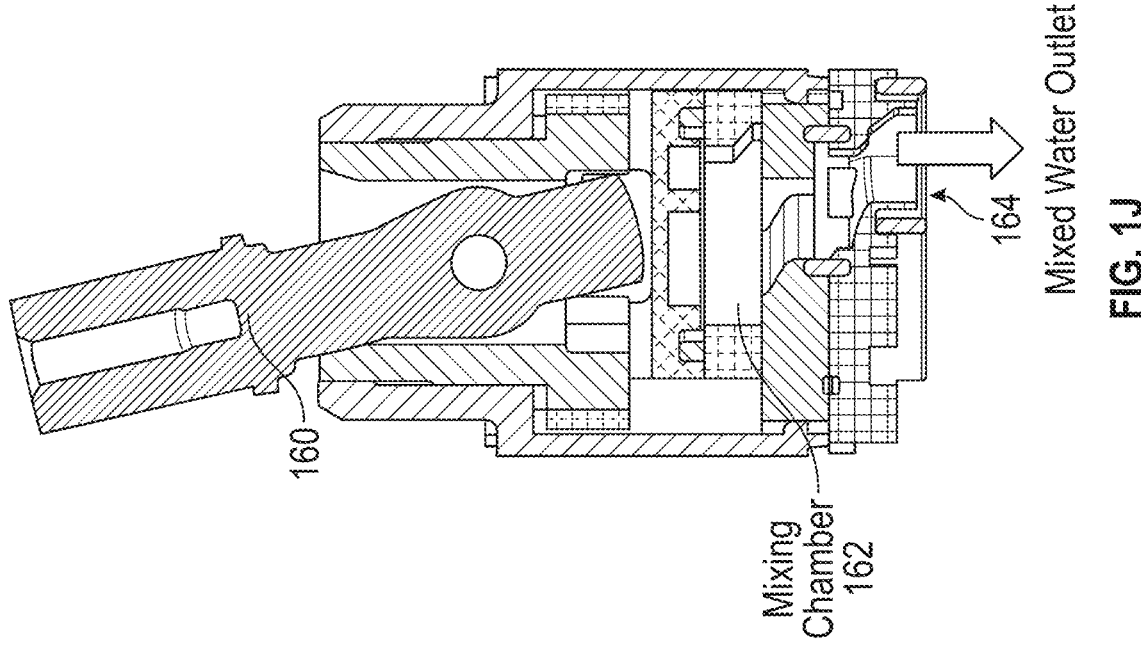
FIG. 1J shows the mixed water outlet of a mixing valve of a faucet assembly in a closed position, according to some embodiments.
Figure 1I:
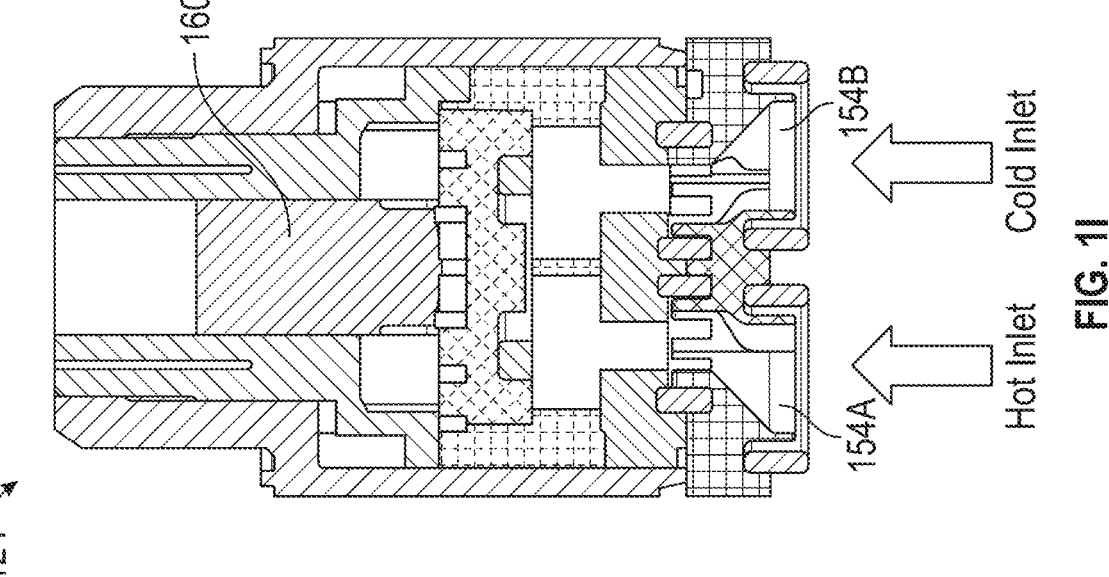
FIG. 1I shows the hot and cold water inlets of a mixing valve of a faucet assembly in a closed position, according to some embodiments.

FIG. 1I shows the hot and cold water inlets of a mixing valve 124 of a faucet assembly in a closed position, and FIG. 1J shows the mixed water outlet 162 of a mixing valve 124 of a faucet assembly in a closed position, according to some embodiments. As shown, FIGS. 11 and/or 1J show stem 160, hot water inlet 154A, cold water inlet 154B, mixing chamber 162, and mixed water outlet 164.

Hot water inlet 154A may be configured to fluidly couple to a hot water outlet of a plastic manifold. Cold water inlet 154B may be configured fluidly couple to a cold water outlet of a plastic manifold. In some embodiments, stem 160 controls the flow of water from hot water inlet 154A and/or cold water inlet 154B into mixing chamber 162.

Mixing chamber 162 is configured to fluidly communicate with mixed water outlet 164. However, when stem 160 is in a closed position, no water is allowed to flow from hot water inlet 154A or cold water inlet 154B to mixing chamber 162. Thus, whenever stem 160 is in a closed position, no mixed water exits the mixing chamber via mixed water outlet 164. In some embodiments, stem 160 may be controlled by a user. For example, in some embodiments, stem 160 may be controlled by a faucet handle.

Figure 1L:
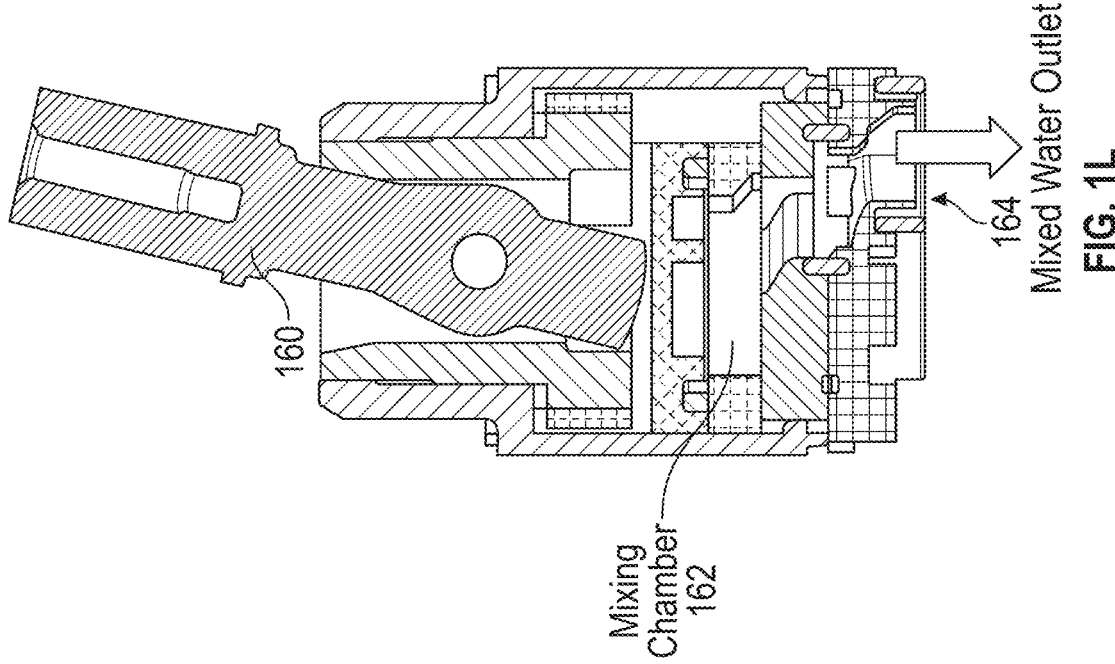
FIG. 1L shows the mixed water outlet of a mixing valve of a faucet assembly in an open position, according to some embodiments.
Figure 1K:
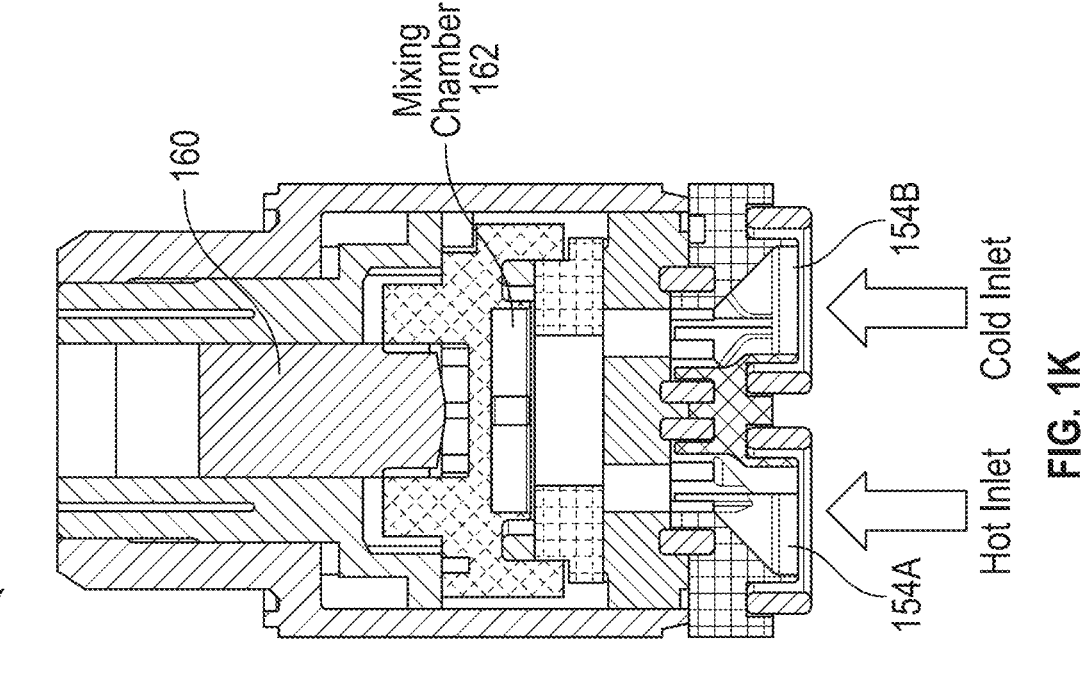
FIG. 1K shows the hot and cold water inlets of a mixing valve of a faucet assembly in an open position, according to some embodiments.

FIG. 1K shows the hot and cold water inlets of a mixing valve 124 of a faucet assembly in an open position, and FIG. 1L shows the mixed water outlet 164 of a mixing valve 124 of a faucet assembly in an open position, according to some embodiments. As shown, FIGS. 1K and/or 1L show stem 160, hot water inlet 154A, cold water inlet 154B, mixing chamber 162, and mixed water outlet 164.

Hot water inlet 154A may be configured fluidly couple to a hot water outlet of a plastic manifold (e.g., hot water outlet 152A of plastic manifold 102 shown in FIGS. 1G-1H). Cold water inlet 154B may be configured fluidly couple to a cold water outlet of a plastic manifold (e.g., cold water outlet 152B of plastic manifold 102 shown in FIGS. 1G-1H). In some embodiments, stem 160 controls the flow of water from hot water inlet 154A and/or cold water inlet 154B into mixing chamber 162. When stem 160 is in an open position, as shown in FIGS. 1K-1L, mixing chamber 162 may be configured to receive water from hot water inlet 154A and/or cold water inlet 154B. In some embodiments, stem 160 may be controlled by a user. For example, in some embodiments, stem 160 may be controlled by a faucet handle.

When stem 160 is in an open position, as shown in FIGS. 1K-1L, mixing chamber 162 may receive hot water from hot water inlet 154A and/or cold water from cold water inlet 154B. In some embodiments, mixing valve 124 may be controlled by a temperature control. Hot water and cold water may mix in mixing chamber 162 to create mixed water at a user-set temperature. In some embodiments, users control the temperature control by adjusting the position of a faucet handle. In some embodiments, users control the temperature control by twisting a plurality of knobs (e.g., a hot water knob and a cold water knob). Mixing chamber 162 may be fluidly coupled to mixed water outlet 164. In some embodiments, mixed water outlet 164 may be fluidly coupled to a mixed water cavity within a plastic manifold (e.g., mixed water cavity 156 within plastic manifold 102 shown in FIGS. 1G-1H).

The foregoing description sets forth exemplary systems, methods, techniques, parameters, and the like. It should be recognized, however, that such description is not intended as a limitation on the scope of the present disclosure but is instead provided as a description of exemplary embodiments.

Although the description herein uses terms first, second, etc. to describe various elements, these elements should not be limited by the terms. These terms are only used to distinguish one element from another.

The invention claimed is:

1. A faucet assembly, comprising:
a plastic manifold comprising a hot water inlet, a cold water inlet, a hot water outlet, a cold water outlet, a mixed water inlet, and a mixed water outlet;
a mixing valve comprising a hot water inlet, a cold water inlet, a mixing chamber, and a mixed water outlet, wherein the hot water inlet is fluidly connected to the hot water outlet of the plastic manifold and the cold water inlet is fluidly connected to the cold water outlet of the plastic manifold, and the mixed water outlet is fluidly connected to the mixed water inlet of the plastic manifold; and
a plastic outlet pipe comprising a water inlet, wherein the water inlet is fluidly connected to the mixed water outlet of the plastic manifold,
wherein the outlet pipe comprises a plastic flexible portion, wherein the plastic flexible portion is housed within a faucet body and comprises a water outlet connected to a faucet outlet, wherein the faucet outlet is configured to dispense mixed water from the faucet assembly and into a sink basin.

2. The faucet assembly of claim 1, wherein the faucet assembly comprises no brass or lead components.

3. The faucet assembly of claim 1, wherein the plastic manifold comprises polyphenylene sulfide.

4. The faucet assembly of claim 1, wherein the plastic manifold is configured to couple to a cold water inlet hose and a hot water inlet hose such that the cold water inlet hose is fluidly connected to the cold water inlet and the hot water inlet hose is fluidly connected to the hot water inlet.

5. The faucet assembly of claim 1, wherein the outlet pipe comprises a plastic adaptor portion.

6. The faucet assembly of claim 5, wherein the plastic adaptor portion comprises polyethylene.

7. The faucet assembly of claim 1, wherein the plastic flexible portion comprises polyethylene.

8. The faucet assembly of claim 1, wherein the plastic flexible portion is configured to rotate relative to a plastic adaptor portion.

9. The faucet assembly of claim 1, wherein the faucet assembly is configured to receive cold water from a cold water supply at the cold water inlet of the plastic manifold, through a cold water cavity and the cold water outlet of the plastic manifold, the cold water inlet of the mixing valve, and to the mixing chamber, and the faucet assembly is configured to receive hot water from a hot water supply at the hot water inlet of the plastic manifold, through a hot water cavity and the hot water outlet of the plastic manifold, the hot water inlet of the mixing valve, and to the mixing chamber, where the hot water is mixed with the cold water to form mixed water.

10. The faucet assembly of claim 1, wherein the faucet assembly is configured to dispense, at a faucet outlet, the mixed water received from the mixing chamber by way of the mixed water outlet of the mixing valve, the mixed water inlet of the plastic manifold, a mixed water cavity, the mixed water outlet of the plastic manifold, the water inlet of the outlet pipe, and through the outlet pipe to the faucet outlet.

11. The faucet assembly of claim 1, wherein the plastic outlet pipe is configured to connect to the plastic manifold using a snap-fitting.

12. The faucet assembly of claim 1, wherein a connection between the plastic flexible portion and the plastic adaptor portion includes a metal clip.

13. The faucet assembly of claim 1, wherein the plastic manifold is housed within a zinc body.

14. The faucet assembly of claim 1, wherein the faucet assembly comprises no threaded connections between any two components.

15. A plastic manifold for a faucet assembly comprising:
a hot water cavity configured to receive hot water from a hot water source by way of a hot water inlet;
a hot water outlet in fluid communication with the hot water cavity;
a cold water cavity configured to receive cold water from a cold water source by way of a cold water inlet,
a cold water outlet in fluid communication with the hot water cavity;
a mixed water cavity configured to receive mixed water by way of a mixed water inlet; and
a mixed water outlet in fluid communication with the mixed water cavity, wherein the mixed water outlet is configured for fluid connection to a plastic outlet pipe comprising a water inlet, wherein the outlet pipe comprises a plastic flexible portion, wherein the plastic flexible portion is housed within a faucet body and comprises a water outlet connected to a faucet outlet, wherein the faucet outlet is configured to dispense mixed water from the faucet assembly and into a sink basin,
wherein the hot water inlet is configured to couple to a hot water inlet hose, the cold water inlet is configured to couple to a cold water inlet hose, the hot water outlet and cold water outlet are configured to couple to a mixing valve, and the mixed water inlet is configured to couple to the mixing valve such that the mixed water cavity is configured to receive mixed water from the mixing valve.

16. The plastic manifold of claim 15, wherein the outlet pipe comprises a plastic adaptor portion.

17. The plastic manifold of claim 16, wherein the plastic flexible portion is configured to rotate relative to the plastic adaptor portion.

* * * * *